June 20, 1961  D. HODKIN  2,989,133
SUSPENSION MEANS FOR THE REAR WHEELS OF MOTOR-VEHICLES
Filed Dec. 26, 1956  4 Sheets-Sheet 1

INVENTOR
DAVID HODKIN
BY
Irwin S. Thompson
ATTORNEY

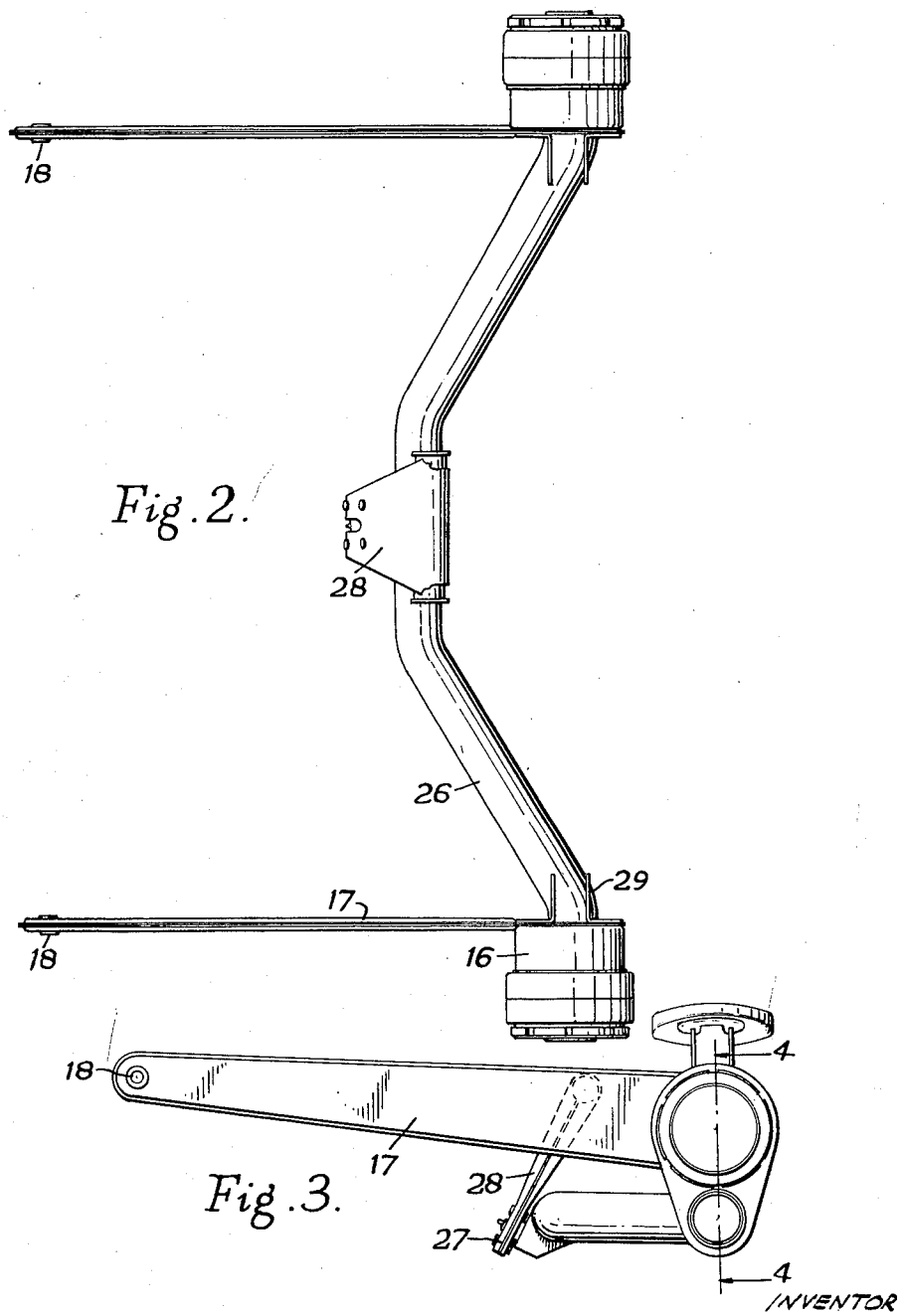

June 20, 1961   D. HODKIN   2,989,133
SUSPENSION MEANS FOR THE REAR WHEELS OF MOTOR-VEHICLES
Filed Dec. 26, 1956   4 Sheets-Sheet 4

INVENTOR
DAVID HODKIN
BY
Irwin S. Thompson
ATTORNEY

United States Patent Office 2,989,133
Patented June 20, 1961

2,989,133
SUSPENSION MEANS FOR THE REAR WHEELS OF MOTOR-VEHICLES
David Hodkin, Dunstable, England, assignor to Engineering Research and Application Limited, a British company
Filed Dec. 26, 1956, Ser. No. 630,542
Claims priority, application Great Britain Dec. 29, 1955
12 Claims. (Cl. 180—73)

This invention relates to suspension means for the rear wheels of motor vehicles.

The main object of the invention is to provide a suspension of simple construction which will effectively take up side loads on the wheels, provides for up and down movements of the wheels, and tilting of the wheel track (i.e. the common axis of the rear wheels) whilst maintaining the wheel track at an unchanging angle to the longitudinal centre line of the motor vehicle. The wheel track should be at right angles to the centre line but even if the wheel track is slightly misplaced this is not too harmful so long as its angular disposition in relation to the centre line remains unchanged through all the movements of the wheels.

According to the present invention a suspension means is provided which comprises a transverse connecting member which is cranked between its ends longitudinally of the vehicle, wheel bearing housings to which the ends of the connecting member are connected, the axes of the housings being disposed transversely of the vehicle, a supporting device which provides a universal joint between the cranked portion of the connecting member and the framework of the vehicle for transmitting transverse wheel loads to said framework, and permits movements of said connecting member longitudinally and rotationally of the vehicle, a pair of arms supporting the bearing housings, which arms are pivoted to the framework on transverse pivots remote from said housings to permit the latter to move approximately vertically, and resilient means interposed between said suspension means and the body of the vehicle.

Figure 1:
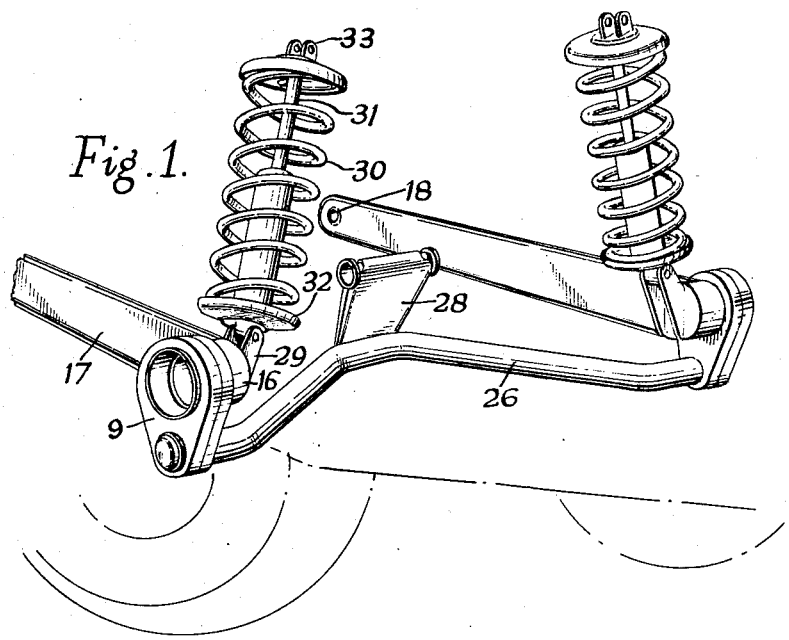
Figure 5:
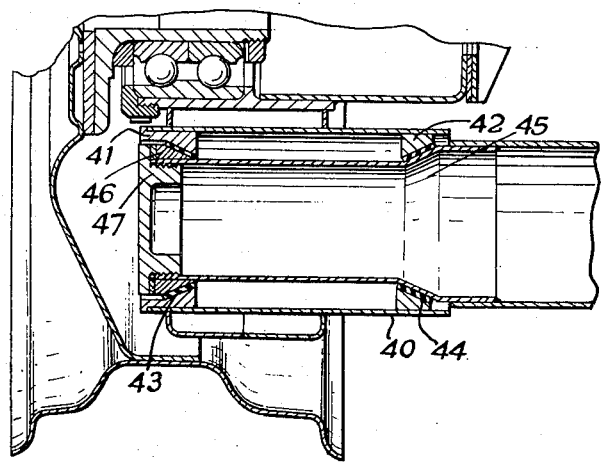
Figure 4:
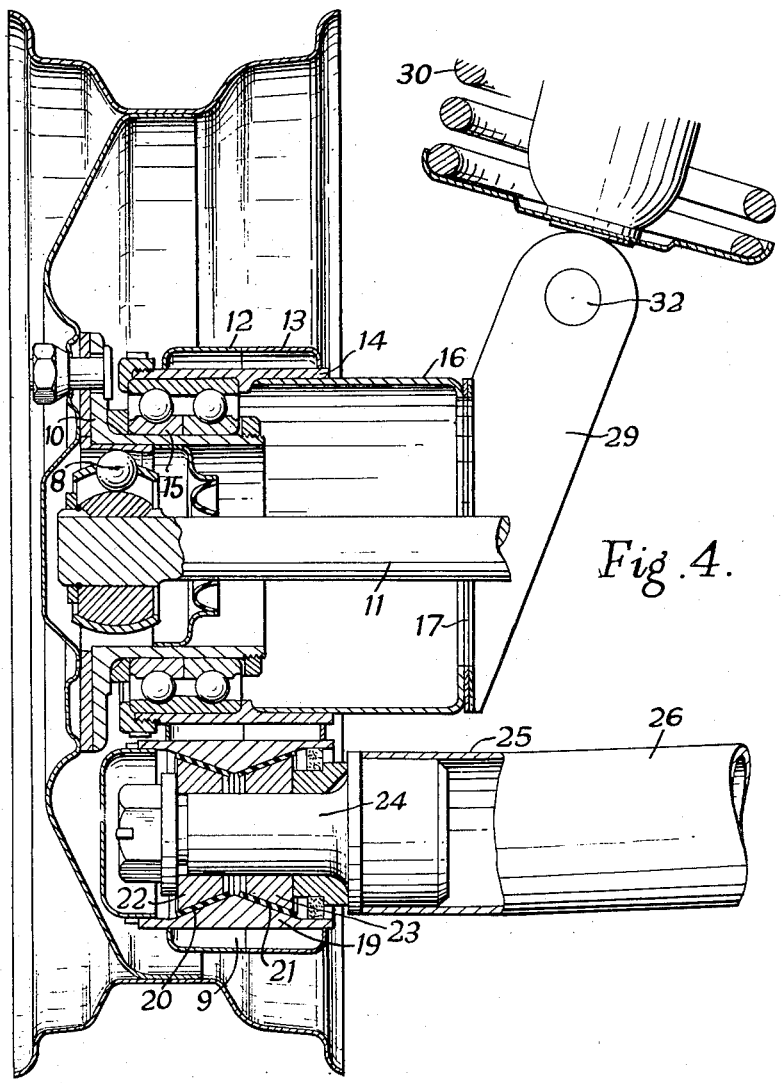
Figure 6:
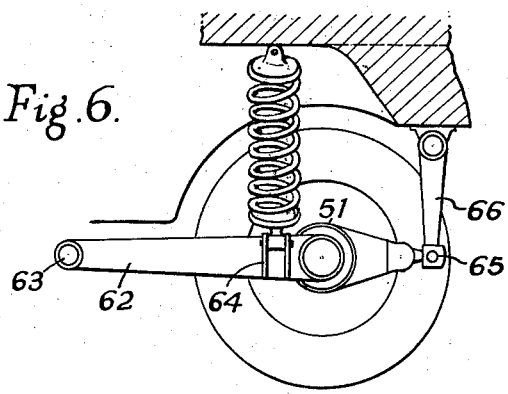
Figure 7:
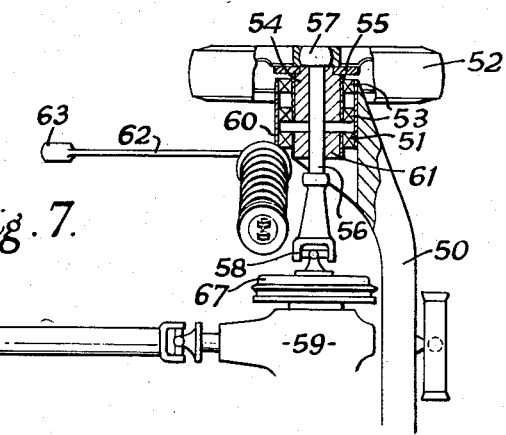
Figure 8:
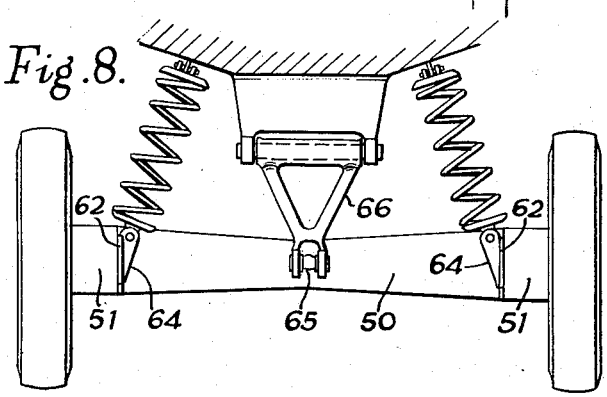

A constructional form of the invention will now be described by way of example with reference to the accompanying drawings in which:

FIGURE 1 is a perspective view of the suspension means with the wheel omitted;
FIGURE 2 shows the suspension means in plan view;
FIGURE 3 is a side view;
FIGURE 4 is a sectional view on the line 4—4 on FIGURE 3 taken along a vertical plane in which lies the axis of the transverse driving shaft, and including a wheel in cross section;
FIGURE 5 is a similar sectional view of that shown in FIGURE 4 but showing a modified construction of the invention;
FIGURE 6 is a side view of a further construction of the invention with the radius arm disposed in a position forwardly of the housings;
FIGURE 7 is a plan view of this construction, and
FIGURE 8 is an end elevation.

In FIGURES 1 to 4 a construction is shown in which each rear wheel is mounted on a hollow stub axle 10 within which the end of the rear driving axle 11 is connected thereto by means of a universal joint 8. A bearing housing 9 is made from two dished parts 12, 13 welded together and carrying a sleeve 14 which extends completely through the housing in which is mounted a ball bearing 15. The stub axle is carried by this bearing 15. The sleeve 14 carries an extension 16 of the housing which has one end of a radius arm 17 welded to it. This arm 17 extends rearwardly from the wheel for a distance of two or three feet and its rear end 18 is mounted on a horizontal transverse pivot on the motor-vehicle stressed framework (e.g. on the chassis or corresponding stressed part of a chassisless motor-vehicle). The arm 17 is approximately horizontal and is fairly thin to provide some flexibility.

The lower part of the housing 9 carries a drum 19 which has a conical rim section engaged by a pair of frusto-conical bearing rings 20, 21 made of synthetic plastics composition. The rings are interiorly engaged by a pair of metal rings 22, 23 carried on a pin 24 fixed to a tube 25 constituting a connecting member 26.

The connecting member is bent rearwardly between its ends and its central part is attached by a ball joint 27 to the lower end of a swinging link 28 the upper end of which is carried by the framework on a transverse axis. The bearing housing extension 16 carries a bracket 29 to which the lower end 32 of a resilient device comprising a hydraulically damped arm 31 and a spring 30, is attached, the upper end of said device being attached to the main structure such as the top of the wheel arch.

The swinging link 28 permits the connecting member to move backwards and forwards and also transmits side loads to the framework.

As already mentioned the arms 17 are two or three feet long; they are therefore certainly considerably longer than the distance from the joint 27 to the axis of the ends of the connecting member 26.

The connecting member somewhat resembles a De Dion tube but differs therefrom by its pivotal mounting in the wheel bearing housings. It could actually be pivoted on the wheel axis but in some cases it is more convenient to provide a separate pivotal axis. It keeps the housings in a constant relationship with each other except for pivotal movement about said separate pivotal axis.

In a modified construction shown in FIGURE 5 a drum 40 is tubular and carries two spaced apart rings 41, 42 having conical surfaces engaged by frusto-conical bearing rings 43, 44 which in turn are supported by a frusto-conical part 45, of a tubular member carried by the connecting member, and a ring 46 having a frusto-conical surface, which is held in position by a nut 47.

Instead of making the frusto-conical bearings of synthetic plastics composition, they may be made from metal with a thin porous surface layer of sintered bronze impregnated with a plastic to form a lubricant.

A further form of the invention is shown in the FIGURES 6, 7 and 8 in which the wheel housings 51 are each provided at the ends of the connecting member 50. These housings are each supported by bearings 53 which carry the stub axle 54 on which the wheel hub 55 is bolted. The stub axle 54 is driven by a shaft 56 by means of an outer universal joint 57 and an inner universal joint 58, which latter joint is driven through a differential 59.

The housings are each pivotally mounted by a bearing 60 on a ring 61. This ring 61 is carried on a radius arm 62 which is pivotally mounted at 63 on the frame, forwardly of said housing.

A bracket 64 is carried on a radius arm 62 close to the housings and supports a mounting means in the form of a coil spring, the upper end of which supports the car body in a position for example at the top of the wheel arch.

The radius arm is positioned both horizontally and longitudinally of the vehicle and locates the axle in the longitudinal position. A vertical link 66 is connected at its lower end to a ball joint 65 on the connecting member and at its upper end to the frame so that sideways movement of the axle is controlled. By this means the axle is capable of pivoting about the ball joint.

In this construction it is convenient to provide a brake 67 at a position between the inner universal joint 58 and differential 59.

An advantage gained in the use of this suspension means is that the centre of the connecting member moves approximately horizontally and not vertically as other suspension means, so that greater luggage space can be provided at the rear of the vehicle.

I claim:

1. A suspension means for motor vehicles which comprises a transverse connecting member which is cranked between its ends longitudinally of the vehicle, wheel bearing housings to which the ends of the connecting member are connected and freely rotatable in the housings about the axis of the ends of the connecting member, the axes of the housings being disposed transversely of the vehicle, a substantially rigid swinging link disposed above the connecting member and upstanding therefrom, means for mounting the upper end of the link on a substantially horizontal axis which is located in a fixed position on the framework of the vehicle, a universal joint which connects the cranked portion of the connecting member to the lower end of said link, said universal joint and said link maintaining said cranked portion at a permanently fixed distance from said horizontal axis and serving for transmitting transverse wheel loads to said framework, said link permitting swinging movements of the cranked part of said connecting member longitudinally of the vehicle, a pair of arms supporting the bearing housings, each of which arms are pivoted to the framework on a transverse pivot remote from said housings and has its other end connected to a wheel housing concentrically with the axis of the wheels thereby permitting the wheel to move approximately vertically, said arms being longer than the distance from said joint to the axis of said ends, and resilient means interposed between said suspension means and the body of the vehicle.

2. A suspension means as claimed in claim 1 having for each housing a drum carried by the housing, said drum having a conical rim section, a first pair of frusto-conical bearing rings engaging the conical rim section, a second pair of rings engaging the first pair of rings interiorly, and a pin carrying the second pair of rings and fixed to the end of the connecting member.

3. A suspension means as claimed in claim 2 wherein the frusto-conical bearing rings are made from a synthetic plastics composition.

4. A suspension means as claimed in claim 2 wherein the bearing rings are made from metal with a thin porous surface layer of sintered bronze impregnated with a plastic to form a lubricant.

5. A suspension means as claimed in claim 1 wherein the housings are formed by sleeves supported one at each end of the connecting member, in which sleeves bearings are provided to mount a stub axle which is drivably connected to the rear driving axle by a universal joint, said ends of the connecting member being coaxial with the sleeves and the housing axes.

6. A suspension means as claimed in claim 5 wherein the housings are each supported by a bearing which is mounted on a ring carried at the end of the radius arm.

7. A suspension means as claimed in claim 5 wherein radius arms are positioned substantially horizontally and longitudinally of the vehicle.

8. A suspension means as claimed in claim 5 wherein the radius arms are positioned forwardly of the housings.

9. A suspension means as claimed in claim 5 wherein brackets are provided on the radius arms close to the housings which carry said resilient means.

10. A wheel suspension for a motor vehicle comprising a vehicle frame, a pair of road wheels on opposite sides of said frame, transversely extending driving means for said road wheels, a rigid transversely extending axle rearwardly of said driving means and interconnecting said wheels, a pair of generally longitudinally extending suspension arms each pivotally connected at one end to said frame and at the opposite end to said axle adjacent the outer ends of the latter and concentrically with the axis of said wheels, and a relatively short link having its opposite ends pivotally connected directly to said frame and to said axle adjacent the transverse midpoint of the axle, said link lying generally in a vertical plane through the longitudinal center line of the vehicle.

11. A suspension means for motor vehicles which comprises a transverse connecting member which is cranked between its ends in one direction longitudinally of the vehicle, wheel bearing housings to which the ends of the connecting member are connected and freely rotatable in the housings about the axis of the ends of the connecting member, the axes of the housings being disposed transversely of the vehicle, a substantially rigid swinging link disposed above the connecting member and upstanding therefrom, means for mounting the upper end of the link on a substantially horizontal axis which is located in a fixed position on the framework of the vehicle, a universal joint which connects the cranked portion of the connecting member to the lower end of said link, said universal joint and said link maintaining said cranked portion at a permanently fixed distance from said horizontal axis and serving for transmitting transverse wheel loads to said framework, said link permitting swinging movements of the cranked part of said connecting member longitudinally of the vehicle, a pair of arms supporting the bearing housings and extending longitudinally of the vehicle from the wheel axis in the same direction as the cranked connecting member, each of which arms has one end thereof pivoted to the framework on a transverse pivot remote from said housings and has its other end connected to a wheel housing concentrically with the axis of the wheel thereby permitting the wheel to move approximately vertically, said arms being longer than the distance from said joint to the axis of said ends, and resilient means interposed between said suspension means and the body of the vehicle.

12. A suspension means as claimed in claim 1 having for each housing a tubular drum carried by the housing below the axis of the housing, two rings located within said drums spaced apart from each other and having interior frusto-conical surfaces with their large diameters remote from each other, a bearing member carried by said cranked connecting member, said bearing member being located within the drum and rings, said bearing member carrying a frusto-conical bearing surface which supports one of said rings, and a bearing ring carried on said bearing member and having an exterior frusto-conical surface supporting the other of said rings.

References Cited in the file of this patent

UNITED STATES PATENTS

| | | |
|---|---|---|
| 2,074,289 | Wagner | Mar. 16, 1937 |
| 2,369,501 | Wagner | Feb. 13, 1945 |
| 2,753,190 | Hooven | July 3, 1956 |

FOREIGN PATENTS

| | | |
|---|---|---|
| 1,091,075 | France | Oct. 27, 1954 |
| 1,115,581 | France | Jan. 9, 1956 |
| 915,417 | Germany | July 22, 1954 |